Jan. 24, 1961     H. H. STEWART     2,969,132

TORQUE LIMITING DEVICES

Filed Dec. 9, 1955

Harold H. Stewart
INVENTOR

BY *Hastings Ashley*

ATTORNEY

United States Patent Office 2,969,132
Patented Jan. 24, 1961

2,969,132

TORQUE LIMITING DEVICES

Harold H. Stewart, 5903 Forest Park Road, Dallas, Tex.

Filed Dec. 9, 1955, Ser. No. 552,160

10 Claims. (Cl. 192—56)

This invention relates to torque limiting devices and more particularly to a clutch which is effective to transmit torque up to a predetermined maximum from a driving member to a driven member, and then to yield in order to prevent damage to the machinery of which the clutch is a component.

An object of this invention is to provide a new and improved clutch which is effective to transmit torque from a driving member to a driven member up to a predetermined maximum, and then release, and which operates efficiency and smoothly without vibration or chattering after releasing.

Another object of the invention is to provide a clutch, of the type described, which is adjustable to operate equally well regardless in which direction the driven member is rotated.

Still another object is to provide a new and improved clutch, of the type described, which is of simple construction and operation whereby economy of fabrication and use may be effected.

Additional objects and advantages of the invention will be readily apparent from the reading of the following description of a device constructed in accordance with the invention, and reference to the accompanying drawings thereof, wherein.

Figure 1:
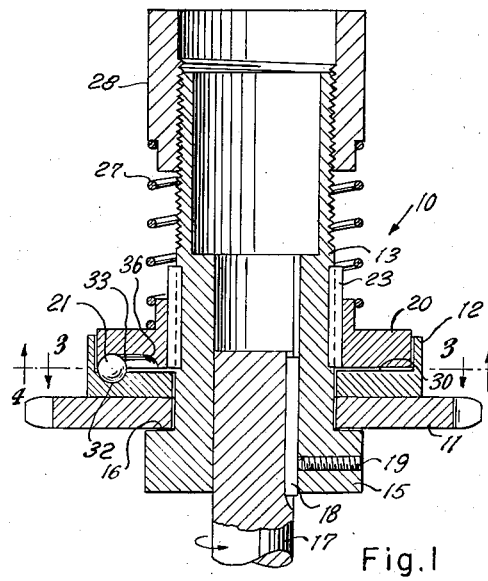
Figure 1 is a vertical sectional view of a clutch constructed in accordance with the invention showing the clutch connecting a driving sprocket gear to a drive shaft.

Referring now to the drawings, the clutch assembly 10 includes a sprocket gear 11 having a driving plate 12 rigidly secured thereto by bolts (not shown), or any other suitable means. The sprocket gear and the driving plate are provided with central apertures by means of which they are rotatably disposed on a hub 13, the hub having an annular flange 15 on its inner end which provides an annular shoulder 16 against which the sprocket gear rides.

The hub is rigidly mounted on the outer end of a driven shaft 17 by means of a key 18 which extends into aligned longitudinal grooves or key slots in the shaft and the hub. The key 18 is locked in place by the set screw 19 threaded radially through the flange of the hub.

The gear 11 and driving plate 12 rotate the hub by means of a sliding clutch plate 20 and balls 21 interposed between the driving plate and the clutch plate. The clutch plate has a central aperture by means of which it is slidably disposed on the hub 13 outwardly of the driving plate. To prevent rotation of the clutch plate about the hub, a pair of keys 23 are mounted in longitudinal key slots 24 in the clutch plate and in recesses 25 in the hub. The clutch plate is thus permitted to slide longitudinally on the hub toward and away from the driving plate while being held against rotation on the hub.

The clutch plate is adjustably resiliently biased toward the driving plate 12 by a spring 27 disposed about the hub, and whose opposite ends bear against the clutch plate and an adjusting nut 28 threaded on the outer end of the hub remote from the flange 15 thereof.

The adjacent opposed faces 30 and 31 of the driving plate and the clutch plate are provided with indentations 32 and slots 33 and 34, respectively. The slots 33 and 34 of the clutch plate have outer ends which are adapted to be disposed in alignment with the indentations 32 so that the balls 21 may be simultaneously disposed in the indentation 32 and the outer ends 35 of either of the slots 33 or 34.

The slots 33 and 34 extend non-radially inwardly on the clutch plate from their outer ends and angularly with respect to the central longitudinal axis of the hub, so that the inner ends 36 of the slots 33 and 34 are disposed inwardly of the indentation and the balls 21 will travel along a circular path 38 on the driving plate inwardly of the indentations when the balls are located in the inner ends of the slots.

The indentations 32 have a depth lesser than the radius of the balls while the slots are deeper than the radius of the balls so that if any rotary movement takes place between the driving plate and the clutch plate, the balls will roll out of the indentations and will always remain in the slots, even though the balls will move in the slots between the outer ends 35 and the inner ends 36 of said slots.

Figure 3:
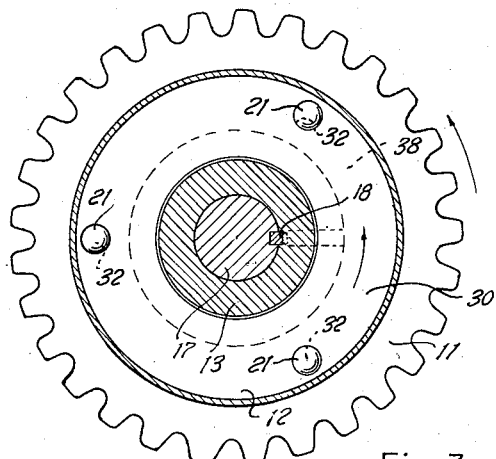
Figure 3 is a sectional view taken on the line 3—3 of Figure 1.
Figure 4:
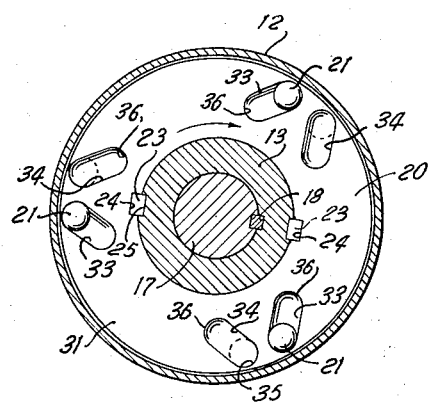
Figure 4 is a sectional view taken on the line 4—4 of Figure 1.

If it be assumed now that the balls 21 are in the indentations 32 and in the outer ends 35 of the slots 33 and that the sprocket gear 11 is rotating in the direction indicated by the arrow in Figure 3, the force exerted by the spring 27 biasing the clutch plate toward the driving plate causes the balls to remain in this position and the clutch plate is thus connected to the driving plate and rotates therewith in the same direction, thus causing the driven shaft to rotate in the same direction, as indicated by the arrow in Figure 1.

Figure 2:
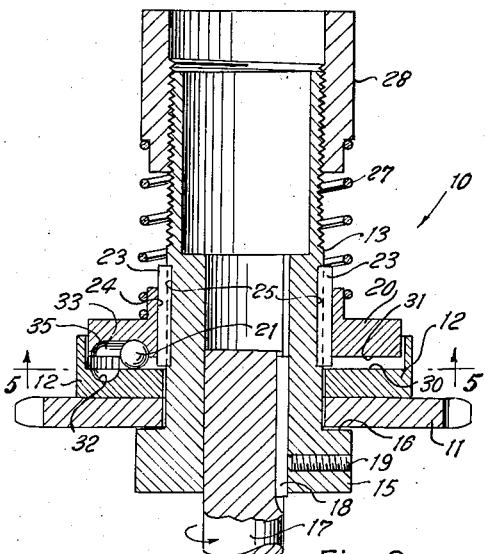
Figure 2 is a similar view showing the components of the clutch in the positions they assume when the predetermined maximum torque has been exceeded to disconnect the driving sprocket gear from the drive shaft.
Figure 5:
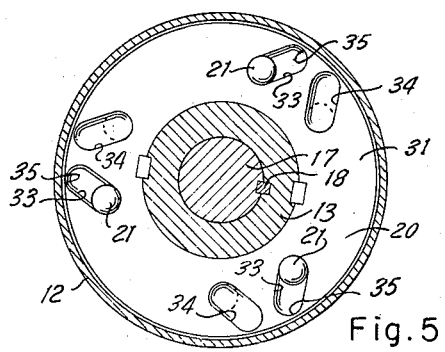
Figure 5 is a sectional view taken on line 5—5 of Figure 2.

If the load on the driven shaft is now increased past a maximum value, the force exerted on the balls by the angled sides of the slots will cause the clutch plate to slide upwardly on the hub and will cause the balls to move inwardly in the slots, the balls riding out of the indentations 32 of the driving plate and from the outer ends 35 of the slots 33 to the inner ends 36 thereof, so that the balls now ride on the path 38 of the driving plate, as indicated in Figures 2 and 5 of the drawing.

With the balls in the inner ends 36 of the slots 33, the driving plate is effectively disconnected from the driven shaft 17 and the driven shaft will cease rotating. Thus, a relative rotation between the driving plate and the clutch plate caused by an overload on the driven shaft causes the sprocket gear to be operatively disconnected from the driven shaft.

Relative rotation of the plates with respect to one another in the opposite direction after the overload condition is corrected will cause the balls to move outwardly in the angled slots 33 and back into the indentations 32 to again connect the sprocket gear to the driven shaft 17.

It will be noted that the clutch operates smoothly when overload conditions exist since the balls roll along the path 38 on the driving plate, and do not enter into and out of the indentations continually during the existence of the overload condition. Thus, hammering of the plates and balls is eliminated.

The set of slots 34 provided in the clutch plate extending divergently inwardly with respect to the slots 33 are provided to permit the shaft 17 to be rotated in the opposite direction. To cause the shaft to rotate in a direction opposite to that indicated by the arrow in Figure 1, the balls must be removed from the slots 33 and into the slots 34. This must be done by moving the clutch plate outwardly and manually moving the balls from one set of slots to the other. The mode of operation of the clutch otherwise remains the same.

It will now be seen that a new and improved torque limiting device has been provided, which includes a pair of adjacent plates, a driving plate and a driven plate, rotatable with respect to one another and connected by balls which are disposed in angled slots in one plate and which are adapted to enter into indentations in the other plate, when disposed outer ends of the slots, the outer ends of the slots being disposed to align or register with the indentations. It will also be apparent that, when the balls 21 are in the inner ends of the slots, the balls roll on a smooth surface of the other plate inwardly of the indentations therein, whereby vibration and hammering under overload conditions is precluded.

It will also be seen that two sets of slots angled divergently in the face of one of the plates may be provided to permit rotation of the driven plate in either direction depending which set of slots the balls are disposed.

It is believed obvious that the shaft 17 may be the driving member and the sprocket gear 11 may be the driven member, if desired.

The foregoing description of the invention is explanatory only and changes in the details of the construction illustrated may be made by those skilled in the art, within the scope of the appended claims, without departing from the spirit of the invention.

What I claim and desire to secure by Letters Patent is:

1. A torque limiting device comprising: a rotatable driving plate; a rotatable driven plate adjacent said driving plate, said plates being rotatable about a common axis; said driving plate having a flat surface provided with a plurality of indentations, said driven plate having a set of slots disposed at an angle to radii extending from said axis and having inner ends near said axis and outer ends remote from said axis, said outer ends only being adapted to register with said indentations, a ball disposed in each of said slots and adapted to enter into an indentation in said driving plate when disposed in the outer end of the slot; the inner ends of the slots being disposed inwardly of the indentations whereby the balls cannot enter into the indentations and engage said flat surface when in the inner ends of the slots; and means biasing the plates toward one another.

2. A torque limiting device comprising: a rotatable driving plate; a rotatable driven plate adjacent said driving plate, said plates being rotatable about a common axis; said driving plate having a flat surface provided with a plurality of indentations, said driven plate having a set of slots disposed at an angle to radii extending from said axis and having inner ends near said axis and outer ends remote from said axis, said outer ends only adapted to register with said indentations, a ball disposed in each of said slots and adapted to enter into an indentation in said driving plate when disposed in the outer end of the slot; the inner ends of the slots being disposed inwardly of the indentations whereby the balls cannot enter into the indentations and engage said flat surface when in the inner ends of the slots; and means biasing the plates toward one another, said indentations having a depth less than the radius of said balls, said slots having a depth greater than the radius of said balls.

3. A torque limiting device comprising: a hub; a driving member rotatably mounted on the hub and having a flat surface provided with a plurality of indentations; a clutch plate non-rotatably mounted on said hub and slidable toward and away from said driving member, said driving member and said hub having a common axis; means biasing said clutch plate toward said driving member, said clutch plate having a set of angled slots disposed at an angle to radii extending from said axis and having inner ends near said axis and outer ends remote from said axis, said outer ends only being adapted to register with said indentations; a ball disposed in each of said slots and adapted to enter into an indentation when disposed in the outer end of the slot, the inner ends of the slots being disposed inwardly of the indentations whereby the balls cannot enter into the indentations when in the inner end of the slots and engage said flat surface.

4. A torque limiting device comprising: a hub; a driving member rotatably mounted on the hub and having a flat surface provided with a plurality of indentations; a clutch plate non-rotatably mounted on said hub and slidable toward and away from said driving member, said driving member and said hub having a common axis; means biasing said clutch plate toward said driving member; said clutch plate having a set of angled slots disposed at an angle to radii extending from said axis and having inner ends near said axis and outer ends remote from said axis, said outer ends only being adapted to register with said indentations; a ball disposed in each of said slots and adapted to enter into an indentation when disposed in the outer end of the slot; the inner ends of the slots being disposed inwardly of the indentations whereby the balls cannot enter into the indentations when in the inner end of the slots and engage said flat surface, said indentations having a depth less than the radius of said balls, said slots having a depth greater than the radius of said balls.

5. The device of claim 1 wherein: the balls are engageable in the indentations when the driving plate is turned in one direction to drive the driven plate; said balls moving out of said indentations against the force of the biasing means when resistance to rotation of the driven plate reaches a predetermined value, whereby the balls move to the inner ends of the slots to permit the driving plate to turn without turning the driven plate.

6. The device of claim 1 wherein: the balls are engageable in the indentations when the driving plate is turned in one direction to drive the driven plate; said balls moving out of said indentations against the force of the biasing means when resistance to rotation of the driven plate reaches a predetermined value, whereby the balls move to the inner ends of the slots to permit the driving plate to turn without turning the driven plate; said balls being movable back to the outer portion of the slots in the indentations upon rotation of the driving plate in the opposite direction to said one direction, to position the balls in the indentations and permit the drive plate to turn the driven plate.

7. The device of claim 4 wherein: the balls move outwardly in the slots to engage in the indentations in the driving member when said driving member is moved in one direction, and thus drive the clutch plate; said clutch plate being movable away from the driving plate to permit the balls to move out of said indentations in the driving plate when the resistance to rotation of the clutch plate reaches a predetermined value, whereby the balls may move in the slots to the inner ends of said slots to permit the driving member to turn without turning the clutch plate.

8. The device of claim 4 wherein: the balls move outwardly in the slots to engage in the indentations in the driving member when said driving member is moved in one direction, and thus drive the clutch plate; said clutch plate being movable away from the driving plate to permit the balls to move out of said indentations in the driving plate when the resistance to rotation of the clutch plate reaches a predetermined value, whereby the balls may move in the slots to the inner ends of said slots to permit the driving member to turn without turning the clutch plate; said balls being moved back to the outer portions of the slots into engagement in the indentations in the driving member when the driving member is moved in the opposite direction to said one direction, whereby the driving member is again operatively connected to the clutch plate by such reverse rotation between the driving member and the clutch plate.

9. A torque limiting device comprising: a rotatable driving plate; a rotatable driven plate adjacent said driving plate, said plates being rotatable about a common axis, one of said plates having a plurality of indentations, the other of said plates having a set of slots disposed at an angle to radii extending from said axis and having inner ends near said axis and outer ends remote from said axis, said outer ends being adapted to register with said indentations, a ball disposed in each of said slots and adapted to enter into an indentation in said one plate when disposed in the outer end of the slot; the inner ends of the slots being disposed inwardly of the indentations whereby the balls cannot enter into the indentations when in the inner ends of the slot; and means biasing the plates toward one another.

10. A torque limiting device comprising: a rotatable driving plate; a rotatable driven plate overlying said driving plate, said plates being rotatable about a common axis, one of said plates having a flat surface and a plurality of indentations formed therein adjacent the outer periphery of said one plate, the other of said plates having a set of slots disposed at an angle to radii extending from said axis and having inner ends overlying a portion of said flat surface near said axis and outer ends remote from said axis, said outer ends being adapted to register with said indentations, a ball disposed in each of said slots and adapted to enter into an indentation in said one plate when disposed in the outer end of the slot; the inner ends of the slots being disposed inwardly of the indentations to position the balls on the said flat surface for rotation thereon; means biasing the plates toward one another; said balls are engageable in the indentations when the driving plate is turned in one direction to drive the driven plate; said balls moving out of said indentations against the force of the biasing means when resistance to rotation of the driven plate reaches a predetermined value, whereby the balls move to the inner ends of the slots to permit the driving plate to turn without turning the driven plate; said balls being movable back to the outer portion of the slots in the indentations upon rotation of the driving plate in the opposite direction to said one direction, to position the balls in the indentations and permit the drive plate to turn the driven plate.

References Cited in the file of this patent

UNITED STATES PATENTS

| 2,182,627 | Gould | Dec. 5, 1939 |
| 2,257,759 | Nilmann | Oct. 7, 1941 |
| 2,508,061 | Fish | May 16, 1950 |
| 2,667,050 | Klamp | Jan. 26, 1954 |

FOREIGN PATENTS

| 556,984 | Germany | Aug. 17, 1932 |